United States Patent [19]

Sato et al.

[11] Patent Number: 4,760,275
[45] Date of Patent: Jul. 26, 1988

[54] COMMUNICATION SYSTEM FOR VEHICLE

[75] Inventors: Yoshihisa Sato, Nagoya; Yuji Hirabayashi, Aichi; Katsunori Ito, Aichi; Susumu Akiyama, Kariya; Takao Saito, Nagoya; Naoki Maeda, Toyota, all of Japan

[73] Assignees: Nippondenso Co., Ltd., Kariya; Toyota Jidosha Kabushiki Kaisha, Toyota, both of Japan

[21] Appl. No.: 54,833

[22] Filed: May 27, 1987

[51] Int. Cl.⁴ ............................................. H04J 15/00
[52] U.S. Cl. ..................................... 307/10 R; 370/32
[58] Field of Search .................... 307/10 R, 10 LS; 318/562; 340/52 R, 825.44, 825.49, 825.52, 825.07–825.17; 370/29, 32; 364/424

[56] References Cited

U.S. PATENT DOCUMENTS

| 4,232,231 | 11/1980 | Reed | 307/10 R |
| 4,594,571 | 6/1986 | Neuhaus et al. | 307/10 R X |
| 4,686,528 | 8/1987 | Ferrer et al. | 340/825.44 |

FOREIGN PATENT DOCUMENTS

| 1195429 | 10/1985 | Canada | 307/10 R |
| 0213576 | 3/1987 | European Pat. Off. | 307/10 R |
| 54-114006 | 9/1979 | Japan | 370/29 |
| 61-229639 | 10/1986 | Japan . | |
| 61-238544 | 10/1986 | Japan . | |
| 61-288637 | 12/1986 | Japan . | |

OTHER PUBLICATIONS

"Local Area Network Technology Applied to Automotive Electronic Communications" by Ronald W. Cox, 1984 IEEE, pp. 71–77.
"A Small Area Network for Cars" by Ronald L. Mitchell, MOS Microprocessor Div. Signetics Corp., Feb. 27, 1984, pp. 177–184.

Primary Examiner—Bentsu Ro
Attorney, Agent, or Firm—Cushman, Darby & Cushman

[57] ABSTRACT

Sensors detect parameters. Control units control vehicle equipments in accordance with the detected parameters. In each of the control units, at least one of the detected parameters and internally produced data is converted into serial data as communication data, and serial data is converted into other form data. A transmission medium connects the control units via a serial data link. Serial interfaces are associated with the control units respectively. Each of the serial interfaces includes a connection terminal connected to the transmission medium, an input terminal and an output terminal both connected to the associated control unit. Each of the serial interfaces inputs serial data from the associated control unit via its input terminal and outputs the inputted data to the transmission medium via its connection terminal. Each of the serial interfaces inputs serial data from the transmission medium via its connection terminal and outputs the inputted data to the associated control unit via its output terminal.

11 Claims, 5 Drawing Sheets

[4,760,275]

COMMUNICATION SYSTEM FOR VEHICLE

BACKGROUND OF THE INVENTION

1. Field of the Invention

This invention relates to a system for providing communication among control devices within a vehicle, such as an automotive vehicle.

2. Description of the Prior Art

Some modern automotive vehicles have electronic control devices, such as an electronic engine control device, an electronic transmission control device, and an electronic shock absorber control device. For example, in an electronic engine fuel supply control device, an actuator or actuators such as fuel injection valves are controlled in accordance with engine operating parameters detected via sensors. It is known to connect these vehicle electronic control devices via a point-to-point type communication system or network.

The known vehicle communication system of the point-to-point type has the following problems, however.

(A) Since the communication is of the point-to-point type, information data inputted into anyone respective control devices are generally exclusively usable. In order to make information data usable in common to the respective different devices, additional interfaces or auxiliary communication devices are necessary. The auxiliary communication devices occupy a large space and increase the cost of the vehicle.

(B) The controls by the respective vehicle control devices are basically mutually independent. The independent controls generally cause an extremely great total length of connecting wires. Such long connecting wires occupy a large space and sometimes cause communication data to be contaminated by noise.

SUMMARY OF THE INVENTION

It is therefore an object of this invention to provide a vehicle communication system which occupies a smaller space than conventional point-to-point type vehicle communication systems.

It is another object of this invention to provide a vehicle communication system which reduces the contamination of communication data by noises in comparison with conventional point-to-point type vehicle communication systems.

In accordance with a vehicle communication system of this invention, sensors detect respective parameters. Control units control vehicle equipments in accordance with the detected parameters. In each of the control units, at least one of the detected parameters and internally produced data is converted into serial data as communication data, and serial data is converted into other form data. A transmission medium connects the control units via a serial data link. Serial interfaces are associated with the control units respectively. Each of the serial interfaces includes a connection terminal connected to the transmission medium, and an input terminal and an output terminal both connected to the associated control unit. Each of the serial interfaces inputs serial data from the associated control unit via its input terminal and outputs the inputted data to the transmission medium via its connection terminal. Each of the serial interfaces inputs serial data from the transmission medium via its connection terminal and outputs the inputted data to the associated control unit via its output terminal.

DESCRIPTION OF THE BASIC PREFERRED EMBODIMENT

Figure 1:
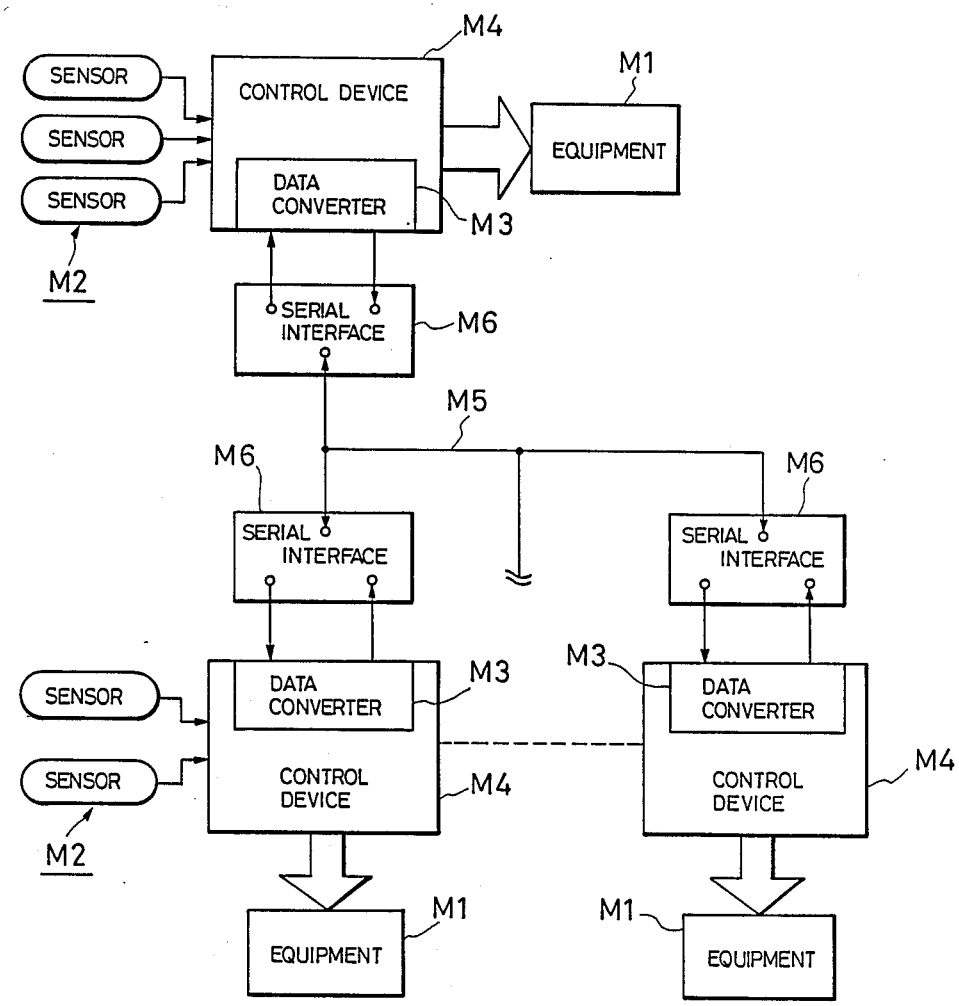
FIG. 1 is a block diagram of a vehicle communication system according to a basic preferred embodiment of this invention.

With reference to FIG. 1, a vehicle includes a plurality of equipments M1 and sensors M2 detecting parameters used in controlling the equipments M1. A plurality of devices M4 control the respective equipments M1 in accordance with the parameters detected via the sensors M2.

Data converters M3 included in the respective control devices M4 derive communication serial data from the parameters detected via the sensors M2 and/or various data produced within the control devices M4. The data converters M3 also derive various data from the communication serial data.

A transmission medium M5 connects the control devices M4 via a serial data link.

A serial interface M6 is associated with each of the control devices M4 respectively. Each of the serial interfaces M6 has a connection terminal connected to the transmission medium M5, and an input terminal and an output terminal connected to the associated control device M4. The serial interface M6 receives serial data from the associated control device M4 via its input terminal, and outputs the serial data to the transmission medium M5 via its connection terminal. The serial interface M6 also receives serial data from the transmission medium M5 via its connection terminal, and transmits the serial data to the associated control device M4 via its output terminal.

The equipment M1 generally serves to control the state of operation of the vehicle. For example, the equipment M1 includes a vehicle powering engine and a transmission in a vehicle power train.

The sensors M2 generally detect parameters related to the vehicle or the engine of the vehicle. For example, the sensors M2 include a vehicle speed sensor, a throttle valve position sensor, a brake pedal position sensor, and a transmission gear or shift position sensor.

Each of the data converters M3 derive communication serial data from the parameters detected via the sensors M2 and/or various data produced within the associated control device M4. The data converter M3 also derives various data from the serial data transmitted via the associated serial interface M6. For example, each of the data converters M3 may be made up of discrete components. The data converter M3 may also be composed of a logic operation circuit such as a programmable microcomputer.

The control devices M4 adjust the associated equipment M1 respectively in accordance with the parameters detected via the sensors M2. Each of the control devices M4 has at least one data converter M3. For example, the control devices M4 include an electronic fuel injection control device related to control of the ouput of the vehicular engine, a shock absorber control device for optimizing damping characteristics of vehicular shock absorbers, and a cruise control device for enabling a preset constant speed travel of the vehicle independent of the position of a vehicle accelerator pedal.

The transmission medium M5 connects the control devices M4 via a serial data link, allowing serial data communication among the control devices M4. The communication can be electric in which case the transmission medium M5 includes communication cables composed of electric wires. In the case of optical communication, the transmission medium M5 includes optical fibers or cables. Wireless communication is also possible, in which case the transmission medium M5 includes only air or a waveguide.

As described previously, the serial interfaces M6 are associated with the control devices M4 respectively. Each of the serial interfaces M6 has a connection terminal connected to the transmission medium M5, and an input terminal and an output terminal connected to the associated control device M4. The serial interface M6 receives serial data from the associated control device M4 via its input terminal, and outputs the serial data to the transmission medium M5 via its connection terminal. The serial interface M6 also receives serial data from the transmission medium M5 via its connection terminal, and transmits the serial data to the associated control device M4 via its output terminal. The serial interface M6 may be disposed within the associated control device M4. The serial interface M6 may also be disposed outside the associated control device M4.

The vehicle communication system of FIG. 1 operates as follows. The control devices M4 adjust the respective associated equipment M1 in accordance with the parameters detected via the sensors M2. Given parameters detected via the sensors M2 and/or various data produced within the control devices M4 are changed by the data converters M3 to serial communication data, and are outputted to the serial interfaces M6. Serial data outputted from the serial interfaces M6 to the associated data converters M3 are changed by the data converters M3 to various data which are used in controlling the associated equipment M1.

The serial interfaces M6 receive respective serial data from their associated control devices M4 via the input terminals, and transmit the serial data to the unassociated control devices M4 those to which they are not associated via the connection terminals and the transmission medium M5. The serial interfaces M6 also receive serial data from the unassociated control devices M4 via the transmission medium M5 and the connection terminals, and transmit the serial data to the associated control devices M4 via the output terminals.

DESCRIPTION OF THE SPECIFIC PREFERRED EMBODIMENT

Figure 2:
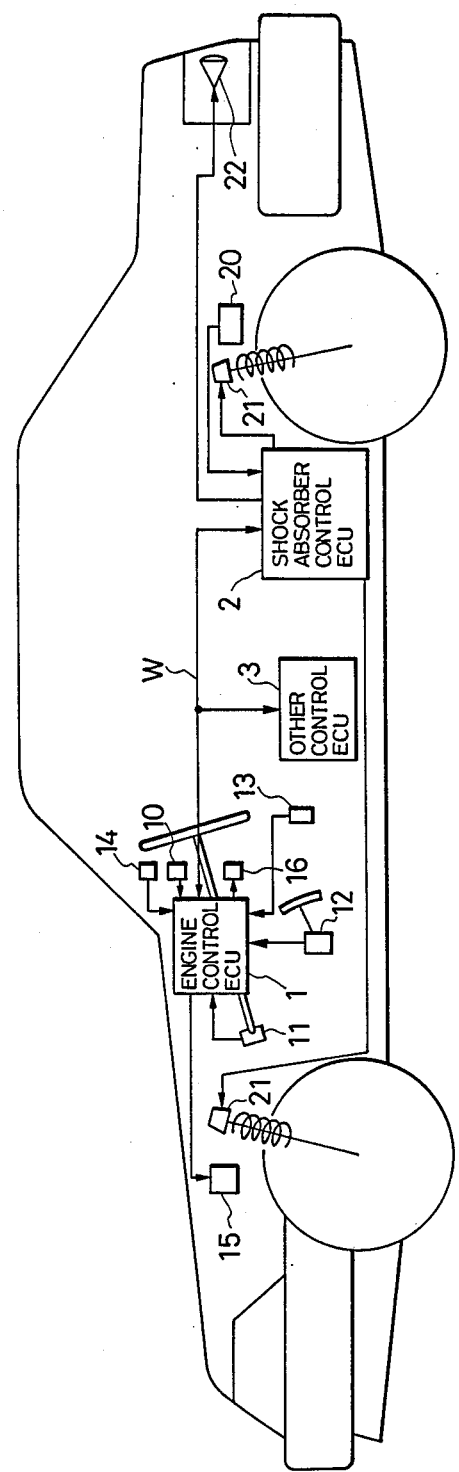
FIG. 2 is a diagram of a vehicle including a communication system according to a specific preferred embodiment of this invention.

With reference to FIG. 2, a vehicle communication system mounted on a motor car includes an engine electronic control unit (ECU) 1, a shock absorber electronic control unit (ECU) 2, and another electronic control unit (ECU) 3 such as a transmission electronic control unit. The engine control unit 1 performs vehicular engine controls, such as fuel injection control and spark timing control, in accordance with vehicle speed, engine rotational speed, and other vehicle or engine operating condition parameters. The shock absorber control unit 2 adjusts damping characteristics of vehicular shock absorbers in accordance with vehicle operating condition parameters, such as vehicle speed and conditions of a vehicle steering wheel. The transmission control unit 3 automatically changes gear or shift position of a vehicle transmission in accordance with vehicle operating condition parameters such as vehicle speed and vehicle accelerator pedal position. The control units 1-3 are connected via a communication wire or network W so that they can communicate with each other.

The engine control unit 1 is disposed near the boundary between a vehicle instrument panel and a bonnet room or engine compartment. Sensors 10-14 located near the engine control unit 1 are connected to the engine control unit 1. The sensor 10 detects vehicle speed. The sensor 11 detects vehicle steering wheel angular positions. The sensor 12 detects whether or not a vehicle brake pedal is depressed. The sensor 13 detects whether or not a vehicle transmission is in its neutral position. The sensor 14 detects selected modes or states of shock absorbers having changeable damping characteristics. The sensors 10-14 generate signals representative of the detected vehicle or engine condition parameters which are outputted to the engine control unit 1. An electromagnetic fuel injection valve or valves 15 are connected to the engine control unit 1. The engine control unit 1 outputs a control signal or signals to the fuel injection valve or valves 15 to adjust the fuel injection valve or valves 15. The fuel injection control signal or signals depend on the detected vehicle or engine condition parameters so that the power output of the engine is controlled in accordance with the detected vehicle or engine condition parameters. A fuel level meter or indicator 16 mounted on the vehicle instrument panel is connected to the engine control unit 1. The control unit 1 outputs a control signal to the fuel meter 16 to control the fuel meter 16. The fuel meter 16 indicates fuel quantity within a fuel tank in accordance with the control signal fed from the engine control unit 1.

The shock absorber control unit 2 is disposed near a trunk room or luggage compartment. A sensor 20 located near the shock absorber control unit 2 is connected to the shock absorber control unit 2. The sensor 20 detects fuel quantity within a fuel tank and generates a signal representative of the detected fuel quantity which is outputted to the shock absorber control unit 2. Electrically driven actuators 21 are disposed near vehicle wheels respectively and are mechanically connected to adjustable shock absorbers. Damping characteristics of the shock absorbers are adjustable via the actuators 21. Each of the actuators 21 can be an electric motor. The actuators 21 are connected to the shock absorber control unit 2. Stop lights 22 mounted on a rear of the vehicle are connected to the shock absorber control unit 2. The shock absorber control unit 2 outputs a control signal to the stop lights 22 to control these stoplights. When the brake pedal sensor 12 detects a depression of the vehicle brake pedal, the stop lights 22 are activated via the control signal fed from the shock absorber control unit 2. As will be described hereinafter, the shock absorber control unit 2 is supplied with vehicle or engine condition parameter signals in addition to the fuel quantity signal. The additional vehicle or engine condition parameter signals supplied to the shock absorber control unit 2 are transmitted from the engine control unit 1 via the communication wire W. For example, the additional vehicle or engine condition parameter signals includes the vehicle speed signal. The shock absorber control unit 2 outputs a control signal or signals to the actuators 21 to control the latters. The control signal or signals depend on the additional vehicle or engine condition parameters so that the damping characteristics of the shock absorbers are controlled in accordance with the additional vehicle or engine condition parameters.

Figure 3:
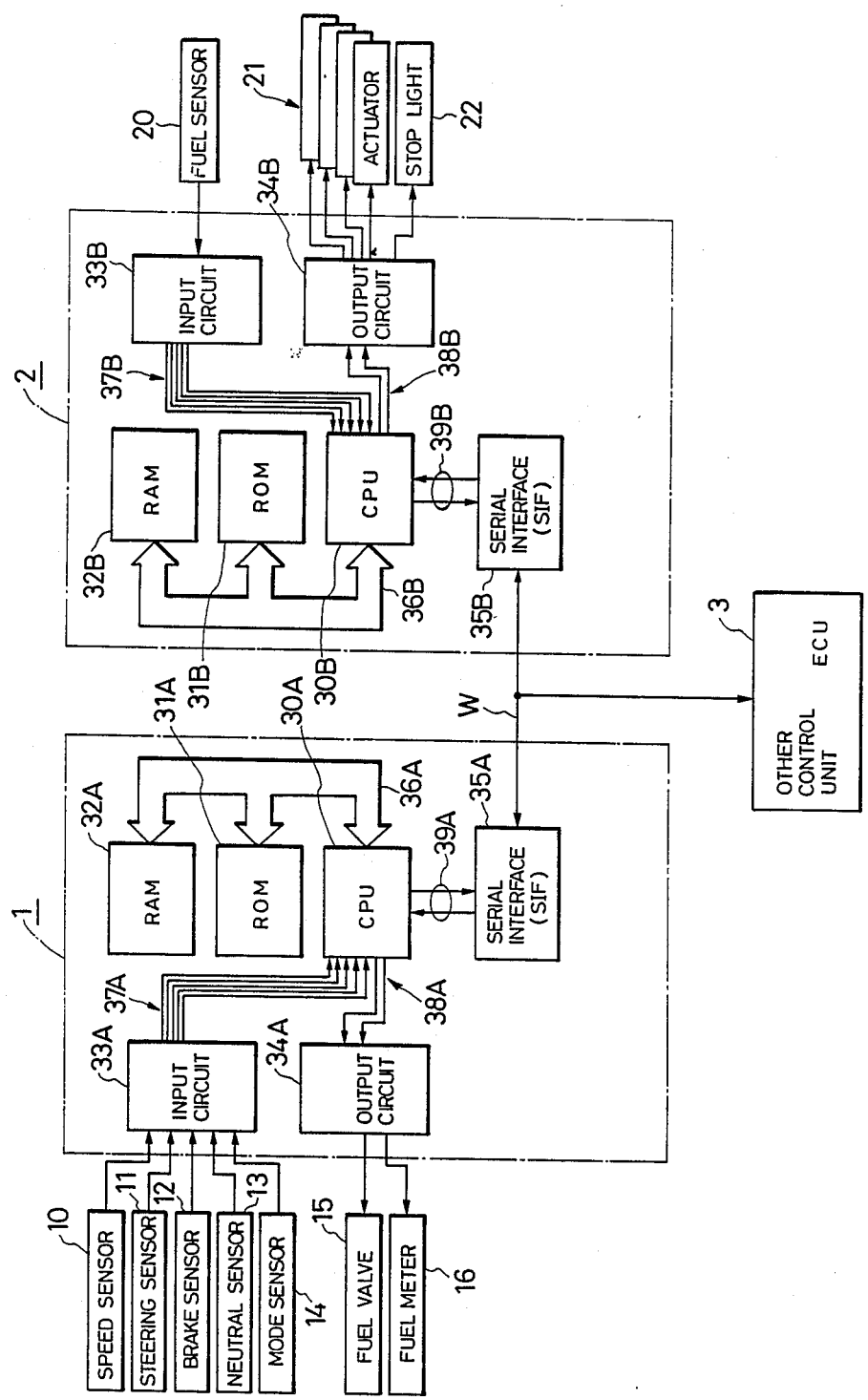
FIG. 3 is a block diagram of the vehicle communication system of FIG. 2.

As shown in FIG. 3, the engine control unit 1 includes a central processing unit (CPU) 30A, a read-only memory (ROM) 31A, a random-access memory (RAM) 32A, an input circuit 33A, an output circuit 34A, and a serial interface (SIF) 35A. The CPU 30A, the ROM 31A, and the RAM 32A are connected via a bus 36A. The input circuit 33A is connected to the CPU 30A via input lines 37A. The output circuit 34A is connected to the CPU 30A via output lines 38A. The serial interface 35A is connected to the CPU 30A via transmission lines 39A.

The shock absorber control unit 2 includes a central processing unit (CPU) 30B, a read-only memory (ROM) 31B, a random-access memory (RAM) 32B, an input circuit 33B, an output circuit 34B, and a serial interface (SIF) 35B. The CPU 30B, the ROM 31B, and the RAM 32B are connected via a bus 36B. The input circuit 33B is connected to the CPU 30B via input lines 37B. The output circuit 34B is connected to the CPU 30B via output lines 38B. The serial interface 35B is connected to the CPU 30B via transmission lines 39B.

The other control unit 3 has an internal structure similar to the internal structures of the engine control unit 1 and the shock absorber control unit 2. Accordingly, the control unit 3 includes a serial interface.

The serial interface 35A of the engine control unit 1, the serial interface 35B of the shock absorber control unit 2, and the serial interface of the other control unit 3 are connected via the communication wire W so that the control units can communicate with each other. It should be noted that these serial interfaces are also connected via ground including a vehicle body.

The input circuit 33A of the engine control unit 1 is connected to the vehicle speed sensor 10, the steering sensor 11, the brake pedal position sensor 12, the transmission neutral position sensor 13, the shock absorber selected mode sensor 14 to receive the signals representing the vehicle or engine operating condition parameters detected by the sensors 10-14. The input circuit 33A. derives digital signals representing the vehicle or engine operating condition parameters detected by the sensors 10-14. These digital signals are transmitted to the CPU 30A via the input lines 37A. The output circuit 34A of the engine control unit 1 is connected to the fuel injection valve or valves 15 and the fuel meter 16 to output control signals to the devices 15 and 16.

The input circuit 33B of the shock absorber control unit 2 is connected to the fuel sensor 20 to receive the signal representing the fuel quantity detected by the sensor 20. The input circuit 33B derives a digital signal representing the detected fuel quantity. The digital fuel quantity signal is transmitted from the input circuit 33B to the CPU 30B via the input lines 37B. The output circuit 34B of the shock absorber control unit 2 is connected to the actuators 21 and the stop lights 22 to output control signals to the devices 21 and 22.

As described previously, the serial interface 35A of the engine control unit 1, the serial interface 35B of the shock absorber control unit 2, and the serial interface of the other control unit 3 are connected via the communication wire W so that the control units 1-3 can communicate with each other. It should be noted that the control units 1-3 are connected also via ground including a vehicle body. The vehicle or engine operating condition parameter data inputted into the CPU 30A of the engine control unit 1 can be transmitted to the CPUs of the other control units 2 and 3 via the serial interfaces and the communication wire W. The fuel quantity data inputted into the CPU 30B of the shock absorber control unit 2 can be transmitted to the CPUs of the other control units 1 and 3 via the serial interfaces and the communication wire W.

The serial interface 35A of the engine control unit 1, the serial interface 35B of the shock absorber control unit 2, and the serial interface of the other control unit 3 have similar or identical internal designs. Only the internal design of the serial interface 35A of the engine control unit 1 will be described hereinafter.

Figure 4:
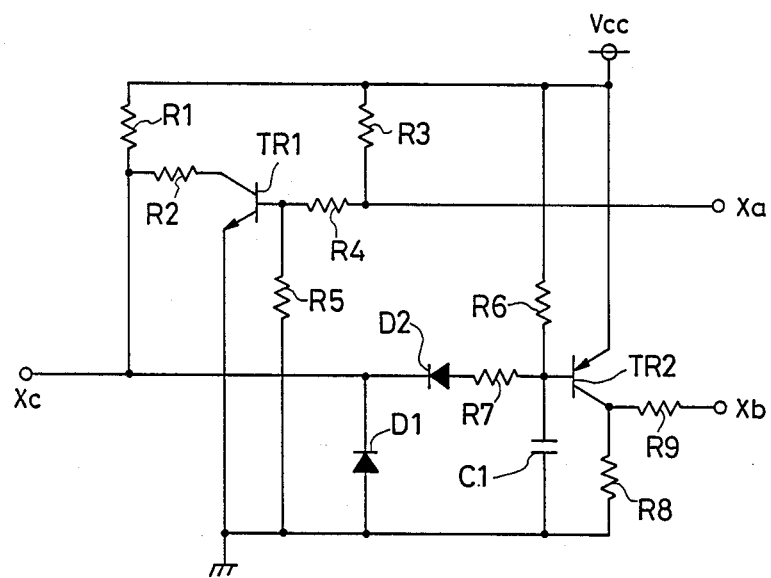
FIG. 4 is a schematic diagram of the serial interface of FIG. 3.

As shown in FIG. 4, the serial interface 35A of the engine control unit 1 includes fixed resistors R1-R9, diodes D1 and D2, transistors TR1 and TR2, and a capacitor C1. The serial interface 35A also includes an input terminal Xa, an output terminal Xb, and a connection terminal Xc. The input and output terminals Xa and Xb are connected to the CPU 30A (see FIG. 3) via the transmission lines 39A (see FIG. 3). The input terminal Xa receives a serial digital signal from the CPU 30A which represents data to be transmitted from the CPU 30A. The output terminal Xb is subjected to a serial digital signal representing data to be transmitted to the CPU 30A. The connection terminal Xc is connected to similar or corresponding connection terminals of the serial interfaces of the other control units 2 and 3 (see FIG. 3) via the communication wire W (see FIG. 3). The connection terminal Xc is subjected to serial digital signals transmitted among the control units 1-3 via the communication wire W.

The input terminal Xa is connected to the base of the transistor TR1 via the resistor R4. The base of the transistor TR1 is connected to a positive terminal of a constant dc voltage source via a series combination of the resistors R3 and R4. It should be noted that the negative terminal of the voltage source is grounded. The collector of the transistor TR1 is connected to the positive terminal of the voltage source via a series combination of the resistors R1 and R2. The junction between the resistors R1 and R2 is connected to the connection terminal Xc. The emitter of the transistor TR1 is grounded. The base of the transistor TR1 is grounded via the resistor R5. The connection terminal Xc is grounded by the diode D1. The connection terminal Xc is connected to the base of the other transistor TR2 via a series combination of the diode D2 and the resistor R7. The base of the transistor TR2 is connected to the positive terminal of the voltage source via the resistor R6. The base of the transistor TR2 is grounded via the capacitor C1. The emitter of the transistor TR2 is connected to the positive terminal of the voltage source. The collector of the transistor TR2 is connected to the output terminal Xb via the resistor R9. The collector of the transistor TR2 is grounded via the resistor R8.

When a serial digital signal applied to the input terminal Xa of the serial interface 35A of the engine control unit 1 assumes a high level, the transistor TR1 is made conductive so that the potential of the connection terminal Xc goes low. The low potential of the connection terminal Xc travels via the communication wire W to corresponding connection terminals of the serial interfaces of the other control units 2 and 3. In each of the control units 2 and 3, when the connection terminal corresponding to the connection terminal Xc moves to a low level, a transistor corresponding to the transistor TR2 is made conductive so that the potential at an output terminal corresponding to the output terminal Xb goes high.

When a serial digital signal applied to the input terminal Xa of the serial interface 35A of the engine control unit 1 assumes a low level, the transistor TR1 is rendered nonconductive so that the potential of the connection terminal Xc goes high. The high potential of the connection terminal Xc travels via the communication wire W to the corresponding connection terminals of the serial interfaces of the other control units 2 and 3. In each of the control units 2 and 3, when the connection terminal corresponding to the connection terminal Xc moves to a high level, the transistor corresponding to the transistor TR2 is made nonconductive so that the potential at the output terminal corresponding to the output terminal Xb goes low.

In this way, a serial digital signal outputted from the CPU 30A to the input terminal Xa of the serial interface 35A of the engine control unit 1 is transmitted to the output terminals of the serial interfaces of the other control units 2 and 3. In a similar way, a serial digital signal outputted from the CPU 30B to the input terminal of the serial interface 35B of the shock absorber control unit 2 is transmitted to the output terminals of the serial interfaces of the other control units 1 and 3. Also, a serial digital signal is transmitted from the control unit 3 to the output terminals of the serial interfaces of the other control units 1 and 2. The serial digital signals transmitted to the output terminals of the serial interfaces of the control units 1-3 travel to the associated CPUs via the transmission lines (39A and 39B in the case of the control units 1 and 2).

The CPUs of the control units 1-3 preferably serve to convert the received serial digital signals into corresponding parallel digital signals having a fixed number of bits such as eight bits. The CPUs preferably serve to convert parallel digital signals to corresponding serial digital signals applied to the input terminals of the associated serial interfaces. It should be noted that a discrete serial-to-parallel converter and a discrete parallel-to-serial converter may be disposed between each of the combinations of the CPUs and the serial interfaces.

The CPUs of the control units 1-3 operate in accordance with programs stored in the ROMs of the units 1-3 respectively. These programs have respective portions enabling data communications. The data communication portions of the programs are reiterated at a period of 4 msec by interruption processes based on hardwares using timers or the like.

Figure 5:
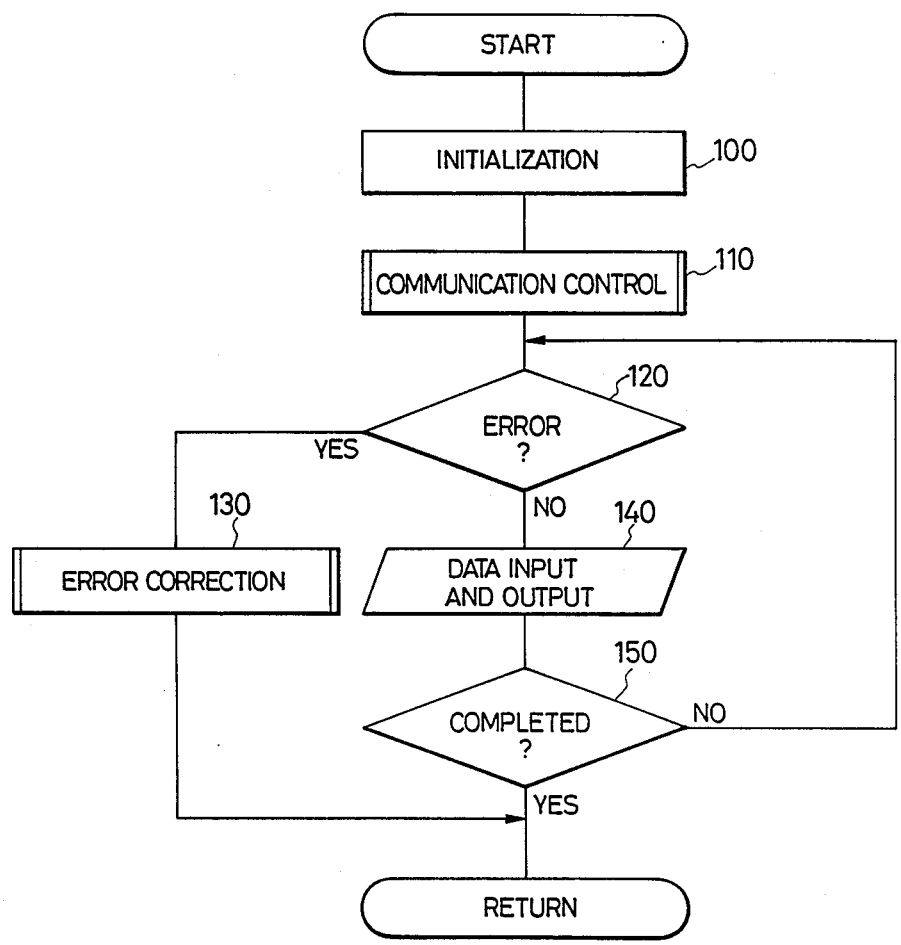
FIG. 5 is a flowchart of a program controlling the central processing unit (CPU) in FIG. 3.

FIG. 5 is a flowchart of the data communication portion of the program controlling the CPU 30A of the engine control unit 1. As shown in FIG. 5, a first step 100 of the program executes an initialisation process. Specifically, the step 100 reads condition codes from the ROM 31A and writes the condition codes in the RAM 32A;

A step 110 following the step 100 executes a communication control process allowing communication between the engine control unit 1 and the other control unit or units with which the engine control unit 1 communicates, in accordance with a communication control sequence generally called a protocol. After the step 110, the program advances to a step 120.

The step 120 checks whether or not communication data have an error such as a framing error or an overrun error. When there is an error, the program advances to a step 130. When there is no error, the program advances to a step 140.

The step 130 executes an error correction or compensation process, such as a process allowing retransmission of communication data. After the step 130, the program returns to a main routine.

The step 140 executes a data input and output process. Specifically, in the case of data transmission, the step 140 converts parallel digital data into corresponding serial digital data and then outputs the serial digital data to the serial interface 35A. In the case of data reception, the step 140 inputs serial digital data from the serial interface 35A and then converts the serial digital data into corresponding parallel digital data having a fixed number of bits such as eight bits. The input and output of data by the step 140 is performed in unit of one word. After the step 140, the program advances to a step 150.

The step 150 determines whether or not the input and output of all data has been completed. When the input and output of all data has been not yet completed, the program returns to the step 120. When the input and output of all data has been completed, the program returns to the main routine. Accordingly, the data input and output step 140 reiterates until the input and output of all data is completed.

The data input and output step 140 allows the CPU 30A of the engine control unit 1 to receive data from the other control units 2 and 3. The step 140 also allows the CPU 30A of the engine control unit 1 to output data to the other control units 2 and 3. For example, the step 140 allows the CPU 30A of the engine control unit 1 to receive the fuel quantity data from the shock absorber control unit 2 which was derived from the signal outputted by the fuel sensor 20. The step 140 also allows the CPU 30A of the engine control unit 1 to supply the shock absorber control unit 2 with the vehicle speed data, the steering data, the brake pedal data, the transmission neutral position data, and the shock absorber selected mode data which were derived from the signals outputted by the vehicle speed sensor 10, the steering sensor 11, the brake pedal position sensor 12, the transmission neutral position sensor 13, and the shock absorber selected mode sensor 14.

The data communication portion of the program controlling the CPU 30B of the shock absorber control unit 2 is similar to the data communication portion of the program controlling the CPU 30A of the engine control unit 1 except for the following modifications.

In the program controlling the CPU 30B of the shock absorber control unit 2, an initialization step corresponding to the initialization step 100 of FIG. 5 reads condition codes from the ROM 31B and writes the condition codes on the RAM 32B. A communication control step corresponding to the communication control step 110 of FIG. 5 allows communication between the shock absorber control unit 2 and the other control unit or units with which the shock absorber control unit 2 communicates. A data input and output step corresponding to the data input and output step 140 of FIG. 5 allows the CPU 30B of the shock absorber control unit 2 to receive data from the other control units 1 and 3. This data input and output step also allows the CPU 30B of the shock absorber control unit 2 to output data to the other control units 1 and 3. For example, the data input and output step allows the CPU 30B of the shock absorber control unit 2 to receive the vehicle speed data, the steering data, the brake pedal data, the transmission neutral position data, and the shock absorber selected mode data from the engine control unit 1 which were derived from the signals outputted by the vehicle speed sensor 10, the steering sensor 11, the brake pedal position sensor 12, the transmission neutral position sensor 13, and the shock absorber selected mode sensor 14. The data input and output step also allows the CPU 30B of the shock absorber control unit 2 to supply the engine control unit 1 with the fuel quantity data which was derived from the signal outputted by the fuel sensor 20.

The data communication portion of the program controlling the CPU of the other control unit 3 is basically similar to the data communication portion of the program controlling the CPU 30A of the engine control unit 1.

The previously-mentioned data communication allows the transmission of the fuel quantity data from the shock absorber control unit 2 to the engine control unit 1. The data communication also allows the transmission of the vehicle or engine operating condition data from the engine control unit 1 to the shock absorber control unit 2. The engine control unit 1 controls the fuel meter 16 in accordance with the received fuel quantity data so that the fuel meter 16 indicates the fuel quantity detected by the fuel sensor 20. The shock absorber control unit 2 adjusts the actuators 21 in accordance with the received vehicle or engine condition data. The shock absorber control unit 2 adjusts the stop lights 22 in accordance with the received brake pedal position data so that the stop lights 22 are activated when the brake pedal is depressed.

As described previously, the engine control unit 1 and the shock absorber control unit 2 are connected via a data link. Thus, without respective direct connections of the shock absorber control unit 2 to the sensors 10-14, the shock absorber control unit 2 can be supplied via the engine control unit 1 and the communication wire W with the vehicle or engine condition data derived through the sensors 10-14. Without direct connection of the engine control unit 1 to the fuel sensor 20, the engine control unit 1 can be supplied via the shock absorber control unit 2 and the communication wire W with the fuel quantity data derived through the fuel sensor 20. Accordingly, the vehicle communication system of this invention generally has a smaller total length of connecting wires than that of a conventional point-to-point type vehicle communication system. In addition, the interfaces 35A and 35B are of the serial type, connections of the interfaces 35A and 35B to the CPUs 30A and 30B generally require a small number of wires. The small total length of connection wires allows the vehicle communication system to occupy a small space. The small total length of connection wires is also advantageous in protecting signals from noise.

What is claimed is:

1. A vehicle communication system comprising:
   (a) a first sensor for detecting a first vehicle operational parameter and generating a first sensor signal representative thereof;
   (b) a first item of vehicle equipment;
   (c) first control means, connected to said first vehicle equipment and to said first sensor signal from said first sensor for controlling said first vehicle equipment and for converting said first sensor signal into a first serial digital signal indicative thereof;
   (d) first serial interface means, having a connection terminal, an input terminal connected to said first control means to receive said first serial digital signal, and an output terminal connected to said first control means to supply a first signal thereto, for transmitting said first serial digital signal from said input terminal to said connection terminal;
   (e) a second sensor for detecting a second vehicle operational parameter and generating a second sensor signal representative thereof;
   (f) a second item of vehicle equipment;
   (g) second control means, connected to said second vehicle equipment and to said second sensor signal from said second sensor, for controlling said second vehicle equipment and for converting said second sensor signal into a second serial digital signal indicative thereof;
   (h) second serial interface means, having a connection terminal, an input terminal connected to said second control means and receiving said second serial digital signal, and an output terminal connected to said second control means to supply a second signal thereto, for transmitting said second serial digital signal from said input terminal to said connection terminal; and
   (i) means connecting said connection terminal of said first serial interface means and said connection terminal of said second serial interface means for transmitting said first serial digital signal and said second serial digital signal between said connection terminals of said first serial interface means and said second serial interface means respectively;
   wherein said first serial interface means receives said second serial digital signal and transmits said second serial digital signal from its connection terminal to its output terminal and outputs said second serial digital signal as said first signal to said first control means via said output terminal,
   and wherein said second serial interface means receives said first signal digital signal and transmits said first serial digital signal from its connection terminal to its output terminal and outputs said first serial digital signal as said second signal to said second control means via ita output terminal; and
   wherein said first control means includes means for deriving said detected second vehicle operational parameter from said second signal and second means for controlling said first vehicle equipment in accordance with both of said detected second vehicle operational parameter and said first sensor signal, and wherein said second control means includes means for deriving said detected first vehicle operational parameter from said first signal and means for controlling said second vehicle equipment in accordance with said detected first vehicle operational parameter.

2. The system of claim 1 further comprising a third sensor for detecting a third vehicle operational parameter and generating a third sensor signal representative thereof, said third sensor being connected to said first control means and outputting said third sensor signal to said first control means, said first control means including means for deriving said detected third vehicle operational parameter from said third sensor signal and means for controlling said first vehicle equipment in accordance with both of said detected first and third vehicle operational parameters and with said detected second vehicle operational parameter.

3. The system of claim 1 wherein said transmitting means comprises a single line connecting said connection terminal of said first serial interface means with said connection terminal of said second serial interface means for transmitting said first serial digital signal and said second serial digital signal over said single line.

4. A vehicle communication system comprising:
   a first sensor for detecting a first vehicle operational parameter and generating a first sensor signal representative thereof;
   a first item of vehicle equipment;
   first control means, connected to said first vehicle equipment and to said first sensor signal from said first sensor, for controlling said first vehicle equipment and for converting said first sensor signal into a first serial digital signal indicative thereof; and further comprises a first serial interface means having:
   (a) connection terminal, an input terminal connected to said first control means to receive said first serial digital signal therefrom and an output terminal connected to said first control means to supply a first signal thereto,
   (b) a first transistor, having a controlling connected terminal to said input terminal to be turned on and off by said first serial digital signal, and having an output connected to said connection terminal, and
   (c) a second transistor, having a controlling terminal connected to said connection terminal and having its output connected to said output terminal to supply said first signal thereto;
   a second sensor for detecting a second vehicle operational parameter and generating a second sensor signal representative thereof;
   a second item of vehicle equipment;
   second control means, connected to said second vehicle equipment and to said second sensor signal from said second sensor, for controlling said second vehicle equipment and for converting said second sensor signal into a second serial digital signal indicative thereof; and
   means for transmitting said first serial digital signal from said connection terminal of said first serial interface means to said second control means and means for transmitting said second serial digital signal from said second control means to said connection terminal of said first serial interface means;
   wherein said second transistor receives said second serial digital signal on said controlling terminal thereof and produces said first signal based thereon, and
   wherein said first control means includes first means for deriving said second vehicle operational parameter from said second serial digital signal and second means for controlling said first vehicle equipment in accordance with both of said first sensor signal and said second vehicle operational parameter.

5. The system of claim 4 further comprising a third sensor for detecting a third vehicle operational parameter and generating a third sensor signal representative thereof, said third sensor being connected to said first control means and outputting said third sensor signal to said first control means, said first control means including means for deriving said detected third vehicle operational parameter from said third sensor signal and means for controlling said first vehicle equipment in accordance with all of said detected first, second and third vehicle operational parameters.

6. An apparatus as in claim 4 further comprises second serial interface means, including:
   (a) a connection terminal, an input terminal connected to said second control means to receive said second serial digital signal, and an ouput terminal connected to said second control means to supply said first serial digital signal thereto, said connection terminal of said second serial interface means being connected to said connection terminal of said first serial interface means,
   (b) a third transistor, having a controlling terminal connected to said input terminal of said second serial interface means, to be turned on and off by said second serial digital signal, and having an output connected to said connection terminal of said second serial interface means, and
   (c) a fourth transistor, having a controlling terminal connected to said connection terminal to receive said first serial digital signal therefrom and having an output connected to said output terminal.

7. An apparatus as in claim 6 wherein said second serial interface means receives said first serial digital signal and transmits said first serial digital signal from its connection terminal to its output terminal and outputs said first serial digital signal as a second signal to said second control means via its output terminal; and
   wherein said first control means includes first means for deriving said detected second vehicle operational parameter from said second signal and second means for controlling said first vehicle equipment in accordance with both of said detected second vehicle operational parameter and said first sensor signal, and wherein said second control means includes third means for deriving said detected first vehicle operational parameter from said first signal and fourth means for controlling said second vehicle equipment in accordance with said detected first vehicle operational parameter.

8. An apparatus as in claim 6 wherein said controlling terminals are respective bases of the transistors.

9. An apparatus as in claim 4 wherein said first transistor is of the NPN-type and said second transistor is of the PNP-type.

10. An apparatus as in claim 9 wherein said output of said first transistor is a collector thereof and said output of said second transistor is an emitter thereof.

11. An apparatus as in claim 4 further comprising means for biasing said transistors.

* * * * *